United States Patent [19]

Shibata

[11] Patent Number: 5,432,340
[45] Date of Patent: Jul. 11, 1995

[54] PHOTOELECTRIC CONVERTER WITH PHOTOELECTRIC CONVERTER ELEMENT MOUNTED IN SHIELDING CASE

[75] Inventor: Sueji Shibata, Tokyo, Japan

[73] Assignee: Yamaichi Electronics Co., Ltd., Tokyo, Japan

[21] Appl. No.: 94,888

[22] Filed: Jul. 22, 1993

[30] Foreign Application Priority Data

Jul. 23, 1992 [JP] Japan .................................. 4-218571

[51] Int. Cl.⁶ .................................................. H01J 5/02
[52] U.S. Cl. ................................... 250/239; 250/227.11
[58] Field of Search ........................ 250/239, 227.11; 385/88

[56] References Cited

U.S. PATENT DOCUMENTS

| | | | |
|---|---|---|---|
| 4,273,413 | 6/1981 | Bendiksen et al. | 250/227.24 |
| 4,539,476 | 9/1985 | Donuma et al. | 250/227.24 |
| 4,836,635 | 6/1989 | De Amorim | 250/239 |
| 5,233,676 | 8/1993 | Yonemura et al. | 385/88 |

*Primary Examiner*—David C. Nelms
*Attorney, Agent, or Firm*—Wenderoth, Lind & Ponack

[57] ABSTRACT

A photoelectric converter comprising a receptacle having therein a photoelectric converting element, and an optical plug. The optical plug is inserted into the receptacle such that the optical plug and the photoelectric converting element are held in opposing relation to each other. The photoelectric converting element is received in a shielding case, and the shielding case with the photoelectric converting element therein is received in the receptacle. A lighting port is formed in a side plate of the shielding case, and the optical plug and the photoelectric converting element are held in opposing relation to each other in the lighting port. A shielding terminal is mounted on the shielding case such that the shielding terminal is exposed from the receptacle.

7 Claims, 5 Drawing Sheets

PHOTOELECTRIC CONVERTER WITH PHOTOELECTRIC CONVERTER ELEMENT MOUNTED IN SHIELDING CASE

BACKGROUND OF THE INVENTION

1. Field of the Invention

This invention relates to a photoelectric converter in which an optical plug is inserted into a receptacle having a photoelectric converting element so as to face the photoelectric converting element.

2. Prior Art

As shown In FIGS. 1 and 2, a conventional photoelectric converter of the type mentioned above comprise a receptacle 2 having therein a photoelectric converting element 1, a ferule 6 of an optical plug 3 attached to a terminal of an optical cable 4 being inserted into the receptacle 2 such that the ferule 6 and the photoelectric converting element 1 are held in opposite relation to each other, thereby obtaining an electric signal from an electric terminal 5 of the photoelectric converting element 1. In the case where a shielding is required, the receptacle 2 which is formed of an insulating material (synthetic resin molded member) is mixed with a carbon fiber and a metal fiber and shaped, and then a shielding terminal 7 as a separate component part is press-fitted into the receptacle 2, and such obtained shielding terminal 7 is then inserted into a wiring board and attached thereto by solder.

However, in the case where the electrically conductive fiber is mixed to the receptacle, there is a problem in that a resistance value is increased or varied due to irregularities of the mixing amount of the fiber and one-sided existence of the fiber in the resin, and as a result, a stable and reliable shielding function is difficult to obtain. In the case of a receptacle in which no electrically conductive fiber is mixed, if the shielding is required, it is difficult to immediately meet with this requirement at the site where assembly work is going on. As a result, it has been necessary to make all receptacles mixed with fibers even at the sacrifice of favorable moldability, and therefore, this is uneconomical.

SUMMARY OF THE INVENTION

It is therefore an object of the present invention to provide a photoelectric converter, in which shielding effect of a photoelectric converting element is ensured and yet the photoelectric converting element and an optical cable can be placed in face-to-face relation to each other.

According to the present invention, there is provided, in order to achieve the above object, a photoelectric converter comprising a receptacle having therein a photoelectric converting element, and an optical plug. The optical plug is inserted into the receptacle such that the optical plug and the photoelectric converting element are held in opposing relation to each other. The photoelectric converting element is received in a shielding case, and the shielding case with the photoelectric converting element therein are received in the receptacle. A lighting port is formed in a side plate of the shielding case, and the optical plug and the photoelectric converting element being held in opposing relation to each other in the lighting port. A shielding terminal is mounted on the shielding case such that the shielding terminal is exposed from the receptacle so as to be connected to a wiring board.

According to the present invention thus constructed, by virtue of a provision of the shielding case receiving therein the photoelectric converting element, there can be obtained a reliable shielding effect. By assembling the shielding case with the photoelectric converting element received therein in the receptacle, the shielding construction as well as the construction of the shielding terminal to be connected to a wiring board can be obtained very easily.

Furthermore, where a shielding is required, it can be easily coped with at the site for assembling the photoelectric converting element. As a result, there can be provided a highly reliable photoelectric converter which effectively prevents external noise from entering therein.

DETAILED DESCRIPTION OF THE INVENTION

Figure 1:
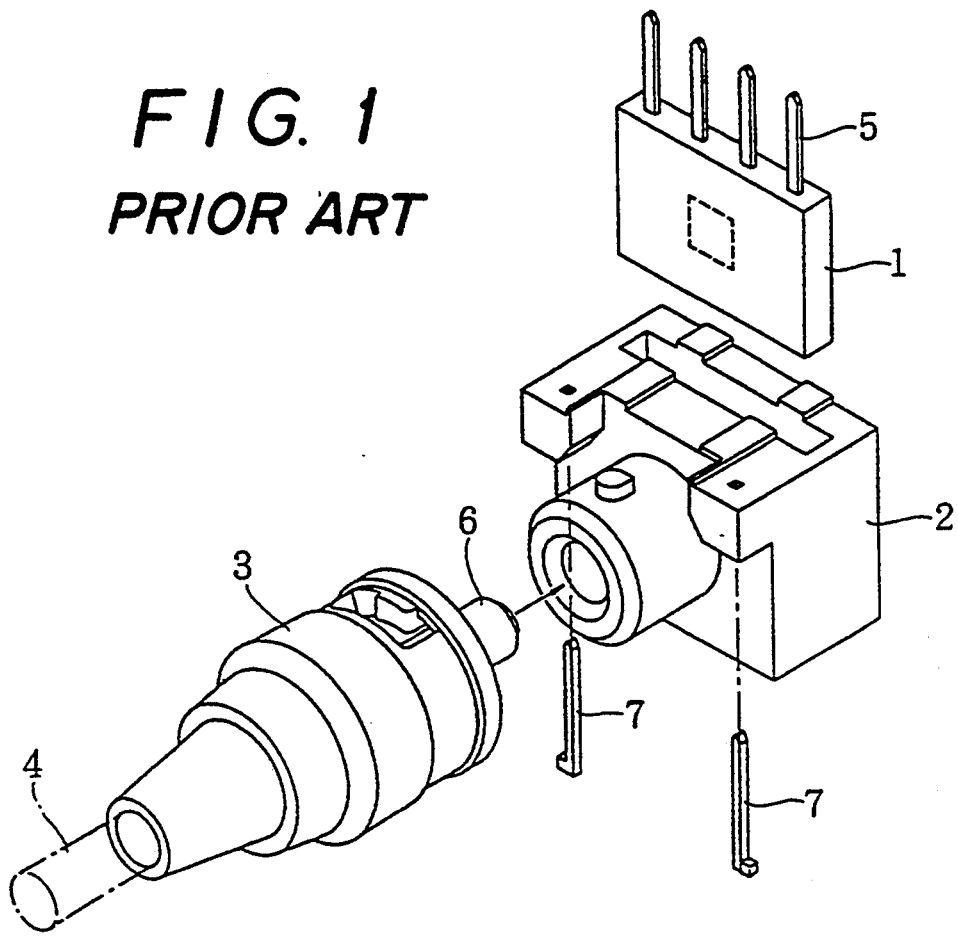
FIG. 1 is an exploded perspective view of a photoelectric converter and an optical plug according to the prior art.
Figure 2:
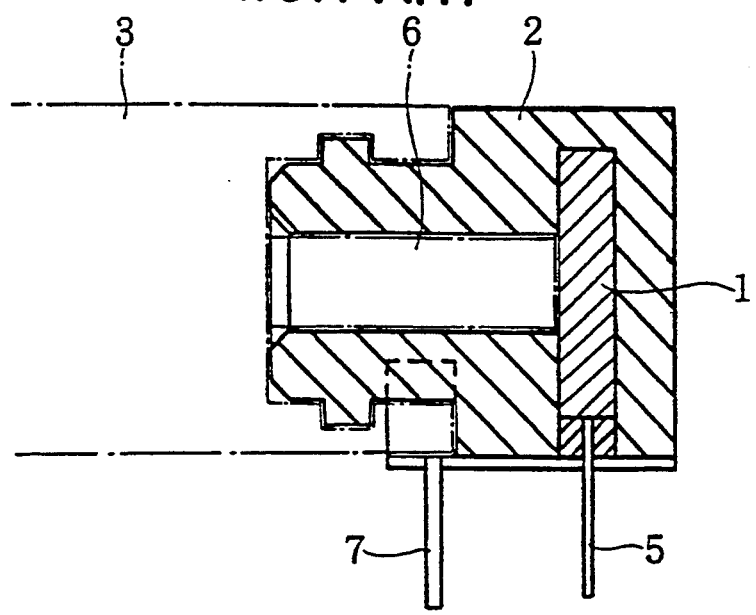
FIG. 2 is a cross-sectional view showing an assembly of the photoelectric converter and the optical plug of FIG. 1.

One embodiment of the present invention will be described hereinafter in detail with reference to the accompanying drawings. In this embodiment, reference numerals are used irrespective of those of the prior art of FIGS. 1 and 2.

Figure 3:
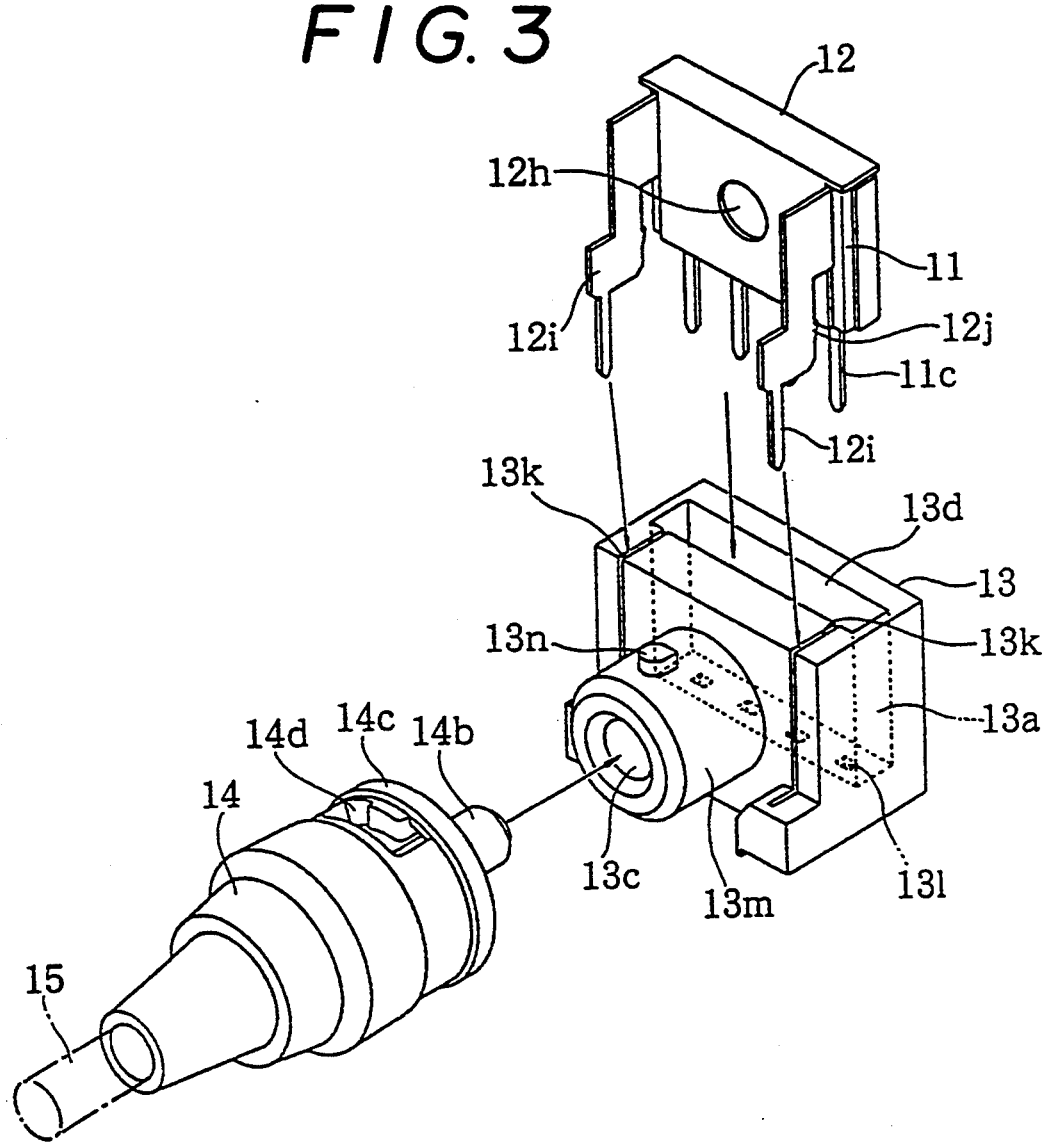
FIG. 3 is an exploded perspective view of a photoelectric converter and an optical plug according to one embodiment of the present invention.
Figure 4:
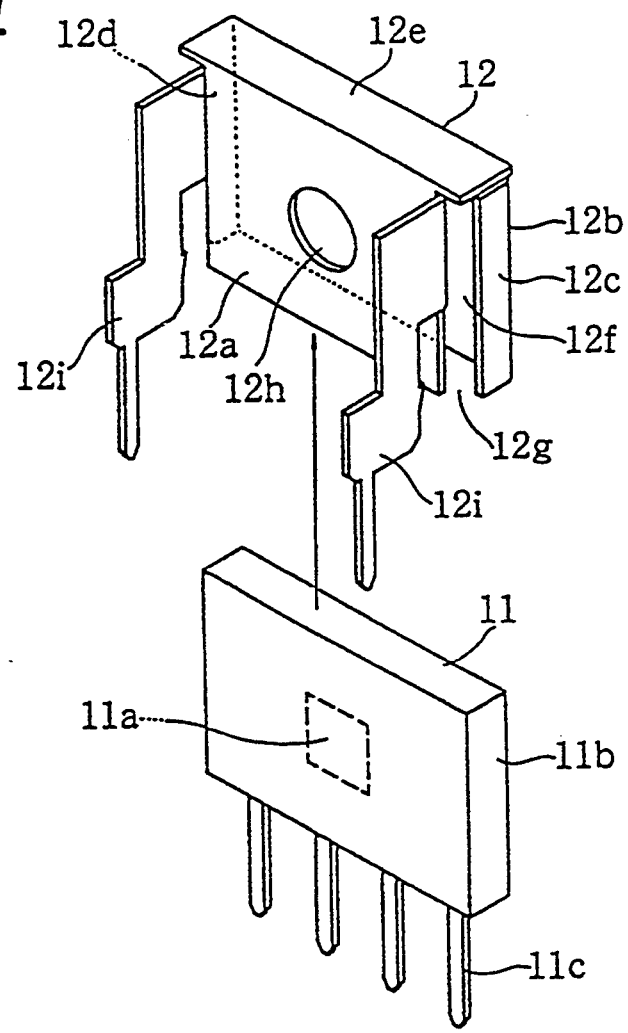
FIG. 4 is an exploded perspective view of a shielding case and an optical converting element constituting the photoelectric converter of FIG. 3.

In FIGS. 3 and 4, reference numeral 11 denotes a photoelectric converting element as represented by an LED, reference numeral 12 denotes a shielding case for receiving the photoelectric converting element 11 therein, reference numeral 13 denotes a receptacle for receiving the shielding case 12 in which the photoelectric converting element 11 is received, and reference numeral 14 denotes an optical plug attached to a terminal of an optical cable 15.

The photoelectric converting element 11 is a package constructed by a bearing element 11a sealed in an electrically insulating shell 11b which is formed of a porous synthetic resin material or the like, and has a generally rectangular flat configuration. An electric terminal 11c of the bearing element 11a extends outwardly of the package. The shielding case 12 is of a generally rectangular flat box shape formed by bending a metal sheet which is punched out of a sheet material. The shielding case 12 includes a front side plate 12a having a wide area, a rear side plate 12b parallel to the front side plate 12a, narrow opposite side plates 12c and 12d parallel to each other, and a bottom side plate 12e. An element receiving chamber 12f is defined by these side plates, 12a to 12e. The element receiving chamber 12f opens through to a lower side surface of the shielding case 12, and this opening serves as an element receiving port 12g. This receiving port 12g opens in to a direction perpendicular to an axis of a plug insertion hole 13b of the receptacle 13.

Figure 6:
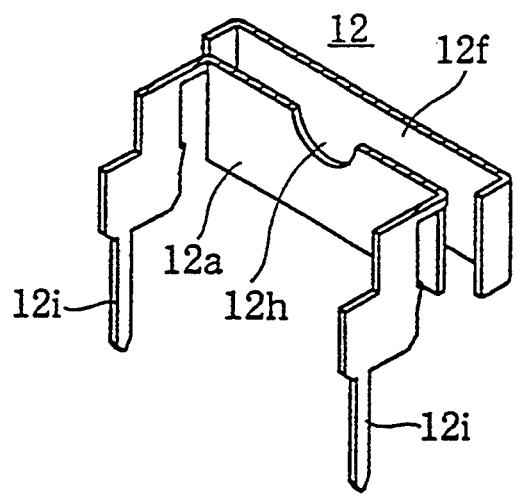
FIG. 6 is a vertical cross-sectional perspective view of the shielding case of FIG. 4.
Figure 7:
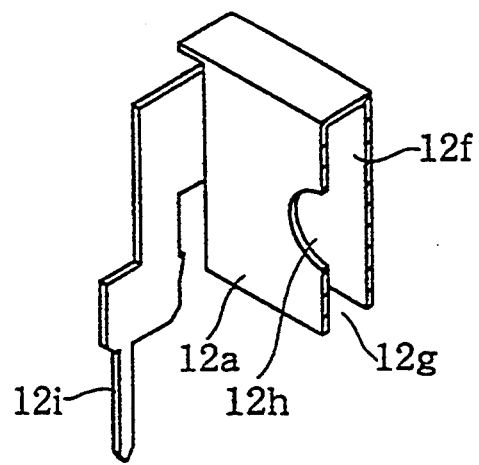
FIG. 7 is a cross-sectional perspective view of the shielding case of FIG. 4.

As shown in FIG. 4, a lighting port 12h is formed through a central portion of the front side plate 12a. As shown in FIGS. 4, 6 and 7, a shielding terminal 12i is bent from each of opposite side edges of the front side plate 12a so as to extend in an opening direction of the element receiving port 12g. This shielding terminal 12i can extend in a direction opposite to the element receiving port 12g or toward the rear side plate 12b depending on the configuration necessary for connecting with a wiring board.

To summarize the above construction, the shielding case 12 is a box-shaped of a sheet metal structure which is open at one side surface in a direction perpendicular to the axis of the plug to form the element receiving port 12g. The photoelectric converting element 11 is inserted into the element receiving chamber 12f defined by the side plates 12a to 12e through the element port 12g, and intimately contracts with an inner surface of the element receiving chamber 12f, that is, each of the side plates 12a to 12e or at least the front and rear side plates 12a and 12b.

In other words, the photoelectric converting element 11 is inserted into the shielding case 12 in such a manner as to intimately contact therewith condition. In order to ensure a reliable fixture between the case 12 and the element 11, an adhesive may be applied to an area of contact between them.

As shown in FIG. 3, when the photoelectric converting element 11 is inserted into the shielding case 12, the electric terminal 11c extends outwardly through the element insertion port 12g.

Figure 8:
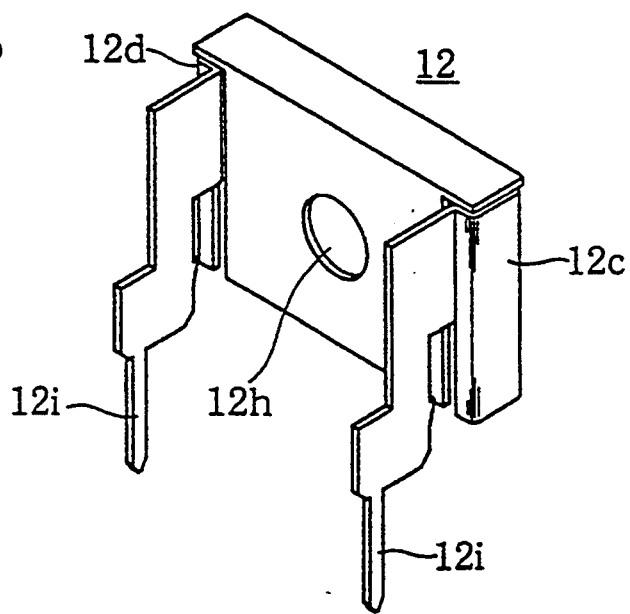
FIG. 8 is a perspective view showing a modified example of the shielding case of FIG. 4.
Figure 9:
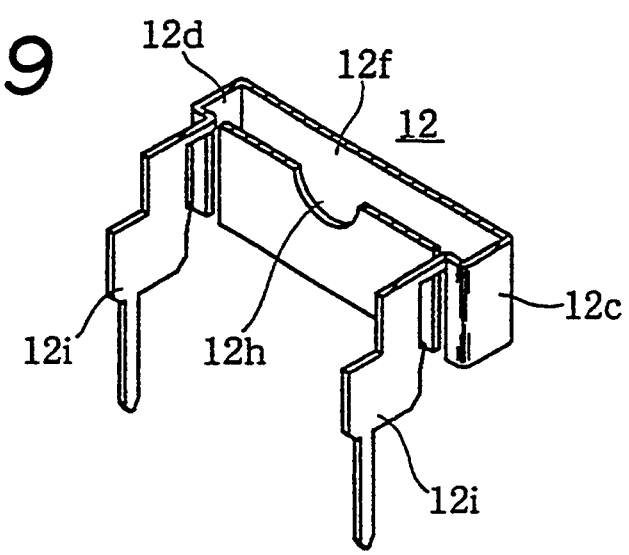
FIG. 9 is a vertical cross-sectional perspective view of FIG. 8.
Figure 10:
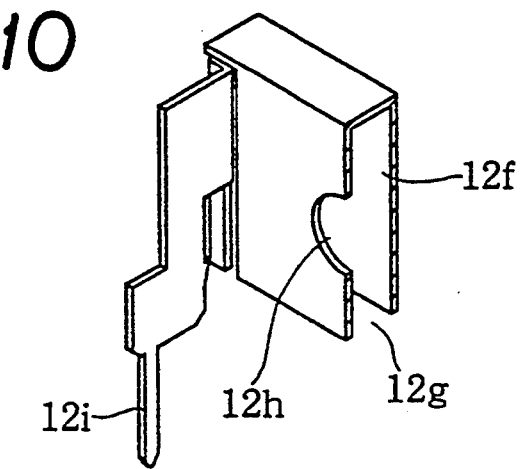
FIG. 10 is a cross-sectional perspective view of FIG. 8.

FIGS. 8 to 10 show a modified example of the shielding case 12. As shown in FIGS. 8 and 10, a pair of shielding terminals 12i may be bent at and extend from the opposite side plates 12c and 12d, for example, from front and rear side edges of the shielding case 12 in a predetermined direction.

In the examples shown in FIGS. 4 and 8, the shielding terminals 12i extend from the side plates of the shielding case 12, respectively. As one example, each terminal 12i is bent and raised so as to be perpendicular to the side plate of the shielding case 12, and extended in a direction perpendicular to the axis of the optical plug insertion hole 13b as later described, so that an extending end portion thereof can be brought into contact with a contacting line of the wiring board.

The receptacle 13 is integrally formed of an insulating material, for example, a synthetic resin material, and has therein a case receiving chamber 13a which is in conformity with the shape of the shielding case 12. The optical plug insertion hole 13b opens through to the front side surface of the receptacle 13 at a plug insertion port 13c. On the other hand, the case receiving chamber 13a opens through the top to the bottom side surface at a case insertion port 13d which is disposed at a right angle to the plug insertion port 13c of the receptacle 13, and the shielding case 12 holding the photoelectric converting element 11 is inserted into the case receiving chamber through the case insertion port 13d.

As mentioned above, the case insertion port 13d and the element insertion port 12g open in directions perpendicular to a direction in which the plug insertion port 13c opens. The shielding case 12 is inserted through the case insertion port 13d such that the lighting port 12h is concentric to and communicated with a terminal end of the plug insertion hole 13b.

For insertion of the shielding case 12 into the case receiving chamber 13a through the case insertion port 13d, the shielding case 12 is inserted such that the element insertion port 12g of the shielding case 12 is located opposite to the case insertion port 13d, and the case insertion port 13d is closed by the bottom side plate 12e of the shielding case 12. That is, the bottom side plate 12e forms a cover of the case insertion port 13d. Therefore, the element insertion port 12g of the shielding element 12 is blocked with a bottom wall of the case receiving chamber 13a to prevent the photoelectric converting element 11 from moving.

The shielding case 12 is constructed so as to be press-fit structure in the receptacle 13. More specifically, the shielding case 12 has, as a part of its structural portion, a press-fit claw to be press-fitted into the receptacle 13, and a projection. As one suitable example, the extending portion of the shielding terminal 12i is provided with a press-fit claw 12j, while the receptacle 13 is provided with a terminal insertion groove 13k into which the shielding terminal 12i is inserted. By engaging the press-fit claw 12j in an inner wall of the terminal insertion groove 13k, the whole shielding case 12 including the terminal 12i is firmly secured the case receiving chamber 13a. Of course, the side plate of the shielding case 12 may be firmly secured to the inner wall surface of the case receiving chamber 13a by an adhesive.

The terminal insertion groove 13k extends through a front wall of the case receiving chamber 13a of the receptacle 13. One end of the terminal insertion groove 13k is opens through to the surface through which the case insertion port 13d opens, and the other end thereof opens through to the opposite surface.

As mentioned above, when the shielding case 12 is inserted into the case receiving chamber 13a, the shielding terminal 12i is simultaneously inserted into the terminal insertion groove 13k under pressure. When the shielding case 12 is received in the case receiving chamber 13a, a lower end of the shielding terminal 12i and a lower end of the electric terminal 11c project outwardly of the surface opposite to the insertion side. The bottom wall of the case receiving chamber 13a is provided with terminal insertion holes 131 through which the electric terminals 11c are inserted.

The shielding terminal 12i and the electric terminal 11c extend in the same direction. In other words, they extend in the direction perpendicular to the axis of the plug insertion hole 13b and project outwardly of the receptacle surface which is perpendicular to the axis of the plug insertion hole 13b.

Figure 5:
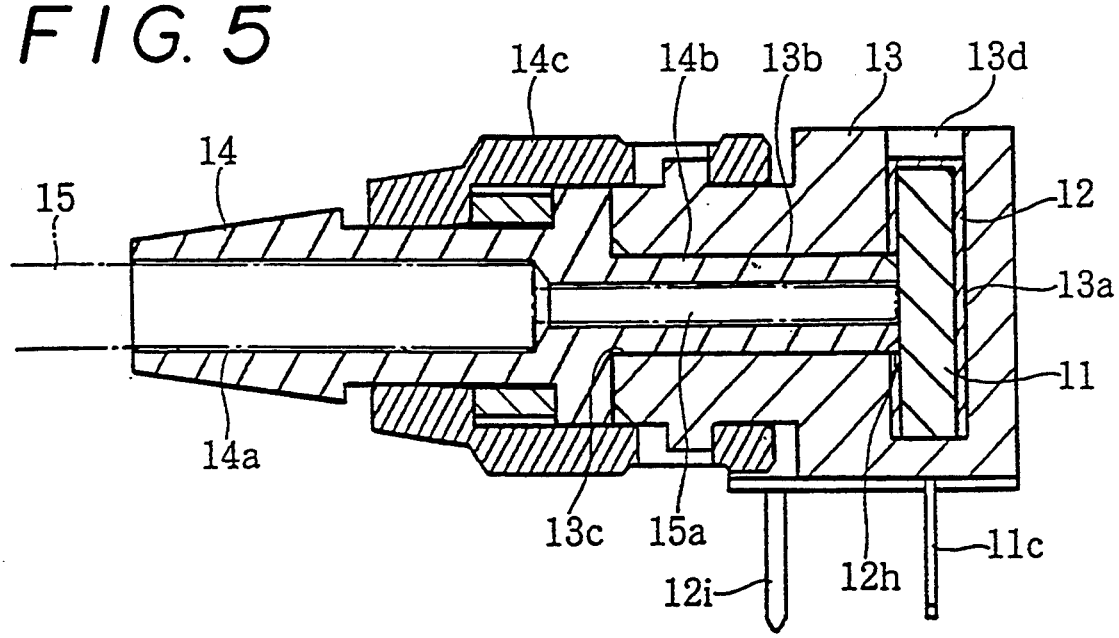
FIG. 5 is a cross-sectional view showing an assembly of the photoelectric converter and the optical plug of FIG. 3.

In FIGS. 3 and 5, the shielding case 12 is inserted into the case receiving chamber 13a such that the element insertion port 12g of the element receiving chamber 12f and the case insertion port 13d of the case receiving chamber 13a are located opposite to each other, i.e. the case receiving chamber 13a and the shielding case 12 open in opposite directions.

The optical plug 14 has a cable insertion hole 14a which opens at both ends thereof. The cable insertion hole 14a linearly extends along the axis. A cable is introduced into the cable insertion hole 14a from the one open end, and an end face of a core wire 15a (optical fiber) exposed from its terminal end is exposed from the other open end.

The optical plug 14 has a ferule 14b holding the core wire 15a on the axis. This ferule 14b is inserted into the plug insertion hole 13b of the receptacle 13, and a distal end portion of the ferule 14b is placed adjacent to the lighting port 12h of the shielding case 12, such that the photoelectric converting element 11 and the end face of the core wire 15a are opposite to each other.

A cylindrical coupling 14c is rotatably engaged with an outer surface of the optical plug 14. This coupling 14c is engaged with an outer surface of a boss 13m which is provided with the optical plug insertion port 13c, and an engagement element 13n projecting from the outer surface of the boss 13m is introduced into and engaged in an engagement hole 14d formed in the coupling 14c, thereby connecting the receptacle 13 and the optical plug 14 with respect to each other.

In this connecting condition, the end face of the core wire and the photoelectric converting element 11 contained in the shielding case 12 are held opposite to each other through the lighting port 12h of the shielding case 12.

According to the present invention, a highly reliable shielding effect can be obtained by the shielding case held by the receptacle, and the optical cable and the photoelectric converting element contained in the shielding case are properly held opposite to each other through the lighting port formed in the shielding case.

Simply by preparing a part in which the photoelectric converting element is received in the shielding case and inserting the same into the receptacle, there can be easily formed a photoelectric converter which can be immediately connected to the wiring board. Also, there can be provided a highly reliable photoelectric converter which is easy to assemble, which is inexpensive, and which prevents external noise from entering therein.

Where the shielding is required, the present invention has such an advantage that the requirement is immediately coped with at the assembling site without requiring the steps of mixing an electrically conductive fiber to the receptacle and press fitting the shielding terminal.

What is claimed is:

1. A photoelectric converter comprising:
    a receptacle having a plug insertion hole formed therein along an axial direction, and a case receiving chamber, said plug insertion hole having first and second ends, said first end opening to an exterior of said receptacle through a plug insertion port, and said second end opening into said case receiving chamber;
    a shielding case, defining an element receiving chamber therein, mounted in said case receiving chamber of said receptacle, said shielding case having a lighting port formed in a wall thereof, said lighting port being aligned with said plug insertion hole of said receptacle;
    a photoelectric converting element mounted in said shielding case;
    a shielding terminal mounted on said shielding case and extending therefrom to an exterior of said receptacle;
    wherein said case receiving chamber has first and second opposite ends and opens through said first end, in a direction perpendicular to said axial direction, to an exterior of said receptacle, and said second end of said case receiving chamber constitutes a substantially closed end, said first end constituting a case insertion port;
    wherein said shielding case has first and second opposing ends, said first end of said shielding case being an open end and constituting a photoelectric converting element-insertion port, and said second end of said shielding case being a substantially closed end; and
    wherein said case receiving chamber opens through said case receiving port in a direction opposite to a direction in which said element receiving chamber opens through said photoelectric converting element-insertion port, such that said substantially closed second end of said shielding case substantially closes said case insertion port of said case receiving chamber.

2. A photoelectric converter as recited in claim 1, wherein
    said receptacle has terminal insertion holes formed therein through said substantially closed end of said case receiving chamber; and
    electric terminals are mounted to said photoelectric converting element and extend therefrom through said photoelectric converter element insertion port of said shielding case and through said terminal insertion holes.

3. A photoelectric converter as recited in claim 2, further comprising
    an optical plug inserted in said plug insertion hole through said plug insertion port such that an end of said optical plug confronts said photoelectric converting element through said lighting port of said shielding case.

4. A photoelectric converter as recited in claim 1, further comprising
    an optical plug inserted in said plug insertion hole through said plug insertion port such that an end of said optical plug confronts said photoelectric converting element through said lighting hole of said shielding case.

5. A photoelectric converter as recited in claim 1, wherein
    said case insertion port constitutes a means for inserting said shielding case into said case receiving chamber.

6. A photoelectric converter as recited in claim 1, wherein
    said shielding case has a press-fit portion for fixing said shielding case in said case receiving chamber upon press-fitting of said shielding case into said case receiving chamber.

7. A photoelectric converter as recited in claim 1, wherein
    said shielding case is formed of sheet metal.

* * * * *